United States Patent Office 3,366,540
Patented Jan. 30, 1968

3,366,540
ANTIBIOTIC ANTI-TUMOR AGENTS AND
METHOD OF PRODUCING SAME
Moses D. Tendler, Monsey, N.Y., assignor to the United States of America as represented by the Secretary of the Department of Health, Education, and Welfare
No Drawing. Filed Aug. 3, 1962, Ser. No. 214,540
7 Claims. (Cl. 167—65)

This invention relates to new antibiotic substances having oncostatic and oncolytic activity when administered to animals, and to method of making the new substances.

The new substances are obtained by culturing newly isolated strains of thermophilic actinomycetes in the range of from about 37° C. to about 56° C. in a sterile liquid medium containing assimilable sources of carbon and nitrogen. The active substances may be salted out of the filtered or centrifuged culture media or out of partial thaw fractions of the frozen culture media.

Specimens of the new strains have been deposited in the American Type Culture Collection under the numbers ATCC 14760, ATCC 14761, and ATCC 14762.

The organisms have short spiral sporophores when grown on maintenance media such as medium Ia of Tendler and Burkholder, Applied Microbiology 9, 394–399 (September 1961), whereas on culture media of the type described below they show a single or bispore arrangement. Spore color is white turning cream to gray to black on aging; reverse color, yellow to gray to black. Exoenzyme spectrum: caseinase, gelatinase, amylase, lipase.

The organisms grow in the temperature range of about 37° C. to about 56° C., with an optimum of about 48° C., and at a pH in the range of 6.1 to 8.4.

A suitable culture medium is made up as follows:

| Component: | Amount, Percent |
|---|---|
| Casein pancreatic digest (Sheffield Chemical Co. N-Z Amine Type B) | 0.5 |
| Soya protein digest (Soytone) | 0.2 |
| Yeast extract | 0.2 |
| Soluble starch | 1.0 |
| D-mannitol | 0.5 |
| $MgSO_4 \cdot 7H_2O$ | 0.05 |
| Microelement solution,[1] 0.1 ml./100 ml. | |

[1] Microelement stock solution per ml.:

| | Mg. |
|---|---|
| Fe as $Fe(NH_4)_2SO_4$ | 1.0 |
| Zn as $ZnSO_4$ | 1.0 |
| Mn as $MnSO_4$ | 0.5 |
| Cu as $CuSO_4$ | 0.08 |
| Co as $CoSO_4$ | 0.1 |
| B as $H_3BO_3$ | 0.1 |

The following example illustrates the production of preparations having anti-tumor activity by the cultivation of ATCC 14760.

The culture medium is inoculated with a subculture of the organism and fermented for about 17½ hours at 48° C. The filtered or centrifuged broth is chilled with constant agitation to substantially completely frozen condition, thawed to about ⅒ the total volume, the thawed portion separated by decanting or filtration and clarified by centrifuging. The supernate is treated with about 30% by weight of ammonuium sulfate and the resulting precipitate is redissolved in physiological saline solution and adjusted to the desired potency on the basis of antibiotic activity against *Staphylococcus aureus* ATCC 13680 in the disc assay method.

A preparation adjusted to a 4 mm. zone of inhibition by the disc assay and sterilized for I.M. or S.C. injection may be used at a daily dosage of 2.0 cc. after slow build-up to determine antigenicity.

Similar anti-tumor preparations may be made by cultivation of ATCC 14761 and ATCC 14762 in the same manner. No general toxicities of the preparations which would interfere with their clinical usefulness have been noted.

I claim:
1. The method of producing an anti-tumor substance which comprises growing an organism selected from the group consisting of ATCC 14760, ATCC 14761, and ATCC 14762 in a sterile liquid nutrient medium containing sources of assimilable carbon and nitrogen at a temperature in the range of from about 37° C. to about 56° C. and precipitating the substance from the medium.

2. The method of producing an anti-tumor substance which comprises growing an organism selected from the group consisting of ATCC 14760, ATCC 14761, and ATCC 14762 in a sterile liquid nutrient medium containing sources of assimilable carbon and nitrogen at a temperature in the range of from about 37° C. to about 56° C. and concentrating the substance in a portion of the medium by partial freezing of the medium and separating the liquid portion.

3. The method of producing an anti-tumor substance which comprises growing ATCC 14760 in a sterile liquid nutrient medium containing sources of assimilable carbon and nitrogen at a temperature in the range of from about 37° C. to about 56° C. and precipitating the substance from the medium.

4. The method of producing an anti-tumor substance which comprises growing ATCC 14760 in a sterile liquid nutrient medium containing sources of assimilable carbon and nitrogen at a temperature in the range of from about 37° C. to about 56° C. and concentrating the substance in a portion of the medium by partial freezing of the medium and separating the liquid portion.

5. An anti-tumor substance obtained by growing ATCC 14760 in a sterile liquid nutrient sodium containing sources of assimilable carbon and nitrogen at a temperature in the range of from about 37° C. to about 56° C.

6. An anti-tumor substance obtained by growing ATCC 14761 in a sterile liquid nutrient medium containing sources of assimilable carbon and nitrogen at a temperature in the range of from about 37° C. to about 56° C.

7. An anti-tumor substance obtained by growing ATCC 14762 in a sterile liquid nutrient medium containing sources of assimilable carbon and nitrogen at a temperature in the range of from about 37° C. to about 56° C.

References Cited

Korman et al.: The Journal of New Drugs, vol. 5, No. 5, September–October 1965; pp. 275–285.

SAM ROSEN, *Primary Examiner.*

J. LEVITT, *Examiner.*